(12) United States Patent
Xiong et al.

(10) Patent No.: US 10,967,500 B2
(45) Date of Patent: Apr. 6, 2021

(54) MOTION CONTROL METHOD AND APPARATUS FOR ROBOT, AND ROBOT WITH THE SAME

(71) Applicant: UBTECH Robotics Corp, Shenzhen (CN)

(72) Inventors: Youjun Xiong, Shenzhen (CN); Rixin Shen, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 315 days.

(21) Appl. No.: 16/212,634

(22) Filed: Dec. 6, 2018

(65) Prior Publication Data

US 2019/0202049 A1 Jul. 4, 2019

(30) Foreign Application Priority Data

Dec. 29, 2017 (CN) .......................... 201711484283.1

(51) Int. Cl.
*B25J 9/00* (2006.01)
*B25J 9/16* (2006.01)
(Continued)

(52) U.S. Cl.
CPC ........... *B25J 9/0006* (2013.01); *B25J 9/0009* (2013.01); *B25J 9/1633* (2013.01); *B25J 13/085* (2013.01);
(Continued)

(58) Field of Classification Search
CPC ...... B25J 9/0006; B25J 9/0009; B25J 9/1633; B25J 13/085; B25J 13/088; B25J 19/02;
(Continued)

(56) References Cited

U.S. PATENT DOCUMENTS 4,663,726 A * 5/1987 Chand .................. G05B 19/353
318/573
5,920,679 A * 7/1999 Ge ...................... G05B 19/4103
318/568.15

(Continued)

FOREIGN PATENT DOCUMENTS

| CN | 105922265 A | 9/2016 |
|---|---|---|
| CN | 106325294 A | 1/2017 |
| CN | 107490965 A | 12/2017 |

OTHER PUBLICATIONS

J. Jiao, Z. Cao, P. Zhao, X. Liu and M. Tan, "Bezier curve based path planning for a mobile manipulator in unknown environments," 2013 IEEE International Conference on Robotics and Biomimetics (ROBIO), Shenzhen, 2013, pp. 1864-1868, doi: 10.1109/ROBIO.2013.6739739. (Year: 2013).*

*Primary Examiner* — Jeff A Burke
*Assistant Examiner* — Joshua Alexander Garza

(57) ABSTRACT

The present disclosure provides a motion control method and apparatus and a robot with the same. The method includes: obtaining a first rotational angle $P_1$ of an output shaft of the servo currently at and a first time $T_1$ for the output shaft of the servo to perform one rotation; obtaining a second rotational angle $P_2$ for the output shaft of the servo to reach and a second time $T_2$ for the output shaft of the servo to rotate from the first rotational angle $P_1$ to the second rotational angle $P_2$; calculating a motion curve B(t) of the output shaft of the servo based on the first rotational angle $P_1$, the second rotational angle $P_2$, the first time $T_1$, and the second time $T_2$; and controlling the servo to rotate according to the motion curve B(t). The present disclosure solves the instability in the gravity center of the robot.

9 Claims, 15 Drawing Sheets

Obtain a first rotational angle $P_1$ of an output shaft of the servo of the robot currently at and a first time $T_1$ for the output shaft of the servo to perform one rotation, and obtain a second rotational angle $P_2$ for the output shaft of the servo to reach and a second time $T_2$ for the output shaft of the servo to rotate from the first rotational angle $P_1$ to the second rotational angle $P_2$ — S101

Calculate a motion curve B(t) of the output shaft of the servo based on the first rotational angle $P_1$, the second rotational angle $P_2$, the first time $T_1$, and the second time $T_2$ — S102

Control the output shaft of the servo to rotate according to the motion curve B(t) — S103

(51) Int. Cl.
  *B25J 13/08* (2006.01)
  *B25J 19/02* (2006.01)
  *B62D 57/032* (2006.01)
(52) U.S. Cl.
  CPC .............. *B25J 13/088* (2013.01); *B25J 19/02* (2013.01); *B62D 57/032* (2013.01)
(58) Field of Classification Search
  CPC ........ B25J 9/161; B25J 9/1607; B25J 9/1602; B25J 9/1628; B25J 9/163; B25J 9/1664; B62D 57/032
  See application file for complete search history.

(56) References Cited

U.S. PATENT DOCUMENTS

| | | | |
|---|---|---|---|
| 2014/0249675 A1* | 9/2014 | Krishnasamy | B25J 9/1664 700/250 |
| 2018/0222057 A1* | 8/2018 | Mizobe | B25J 9/1697 |
| 2018/0225113 A1* | 8/2018 | Hasegawa | B25J 9/161 |
| 2019/0126474 A1* | 5/2019 | Skogsrud | G05B 13/04 |

\* cited by examiner

Obtain a first rotational angle $P_1$ of an output shaft of the servo of the robot currently at and a first time $T_1$ for the output shaft of the servo to perform one rotation, and obtain a second rotational angle $P_2$ for the output shaft of the servo to reach and a second time $T_2$ for the output shaft of the servo to rotate from the first rotational angle $P_1$ to the second rotational angle $P_2$ — S101

Calculate a motion curve $B(t)$ of the output shaft of the servo based on the first rotational angle $P_1$, the second rotational angle $P_2$, the first time $T_1$, and the second time $T_2$ — S102

Control the output shaft of the servo to rotate according to the motion curve $B(t)$ — S103

MOTION CONTROL METHOD AND APPARATUS FOR ROBOT, AND ROBOT WITH THE SAME

CROSS REFERENCE TO RELATED APPLICATIONS

This application claims priority to Chinese Patent Application No. 201711484283.1, filed Dec. 29, 2017, which is hereby incorporated by reference herein as if set forth in its entirety.

BACKGROUND

1. Technical Field

The present disclosure relates to robot technology, and particularly to a motion control method and apparatus for a robot, and a robot with the same.

2. Description of Related Art

With the advancement of technology, it has become more and more common to use robots instead of humans to perform a variety of tasks. In order to make a robot to perform various tasks such as sweeping and dancing in a smooth manner, first of all, the robot has to be made to have a good motion capability. The motion of the robot is mainly carried out by the motion of the joints of the robot, and each joint of the robot includes a servo. In which, the servo is a control device for controlling the joint of the robot to perform various kinds of motion.

The motion of the joints of the robot is usually performed at a constant speed. For example, assuming that a joint A of the robot is to be moved from an angle a to an angle b while the moving time is T, during the movement of the joint A of the robot from the angle a to the angle b, the changing speed of the angle is always $|(b-a)/T|$. The disadvantage of the motion manner of the joint is that, since the robot is in a static state at the beginning, if there is a sudden speed, the joint of the robot will be abruptly changed from a stationary state to a motion state while the duration $\Delta T$ of the changing process is small, and a large change in the speed of the robot will inevitably lead to a large acceleration $\Delta V$ of the robot which is likely to cause the robot to fall due to the instability in the gravity center.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

FIG. 4 is a flow chart of an embodiment of a motion control method for a robot according to the present disclosure.

DETAILED DESCRIPTION

In order to make the objects, technical solutions and advantages of the present disclosure more clear, the present disclosure will be further described in detail below with reference to the accompanying drawings and embodiments. It should be understood that, the embodiments described herein are merely illustrative of the present disclosure and are not intended to limit thereto.

Figure 1A:
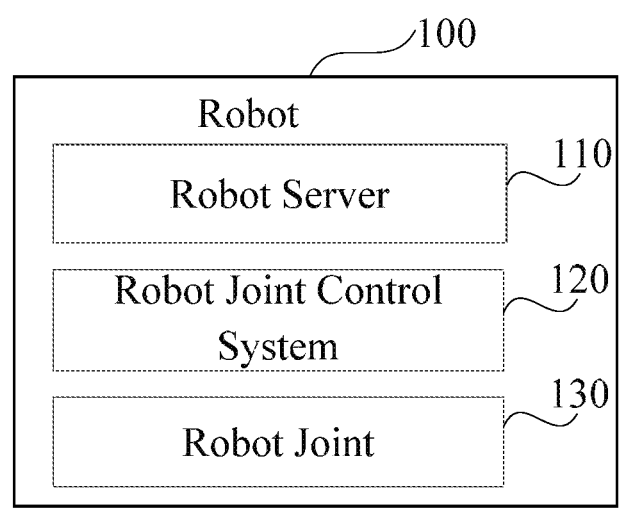
FIG. 1A is a schematic block diagram of three important components of a robot according to an embodiment of the present disclosure.
Figure 1B:
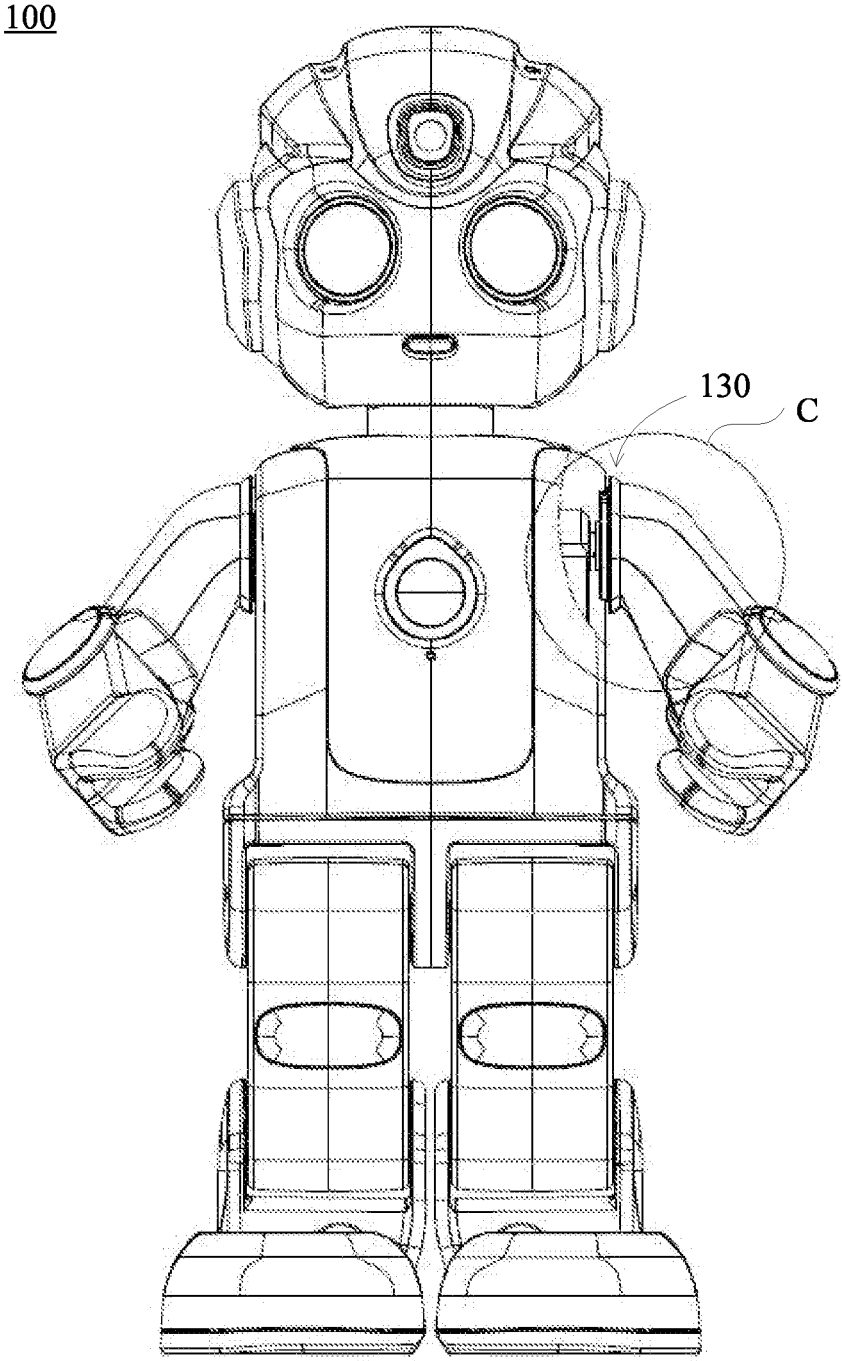
FIG. 1B is a schematic view of a robot, which is partly cut to show a servo of a joint.
Figure 1C:
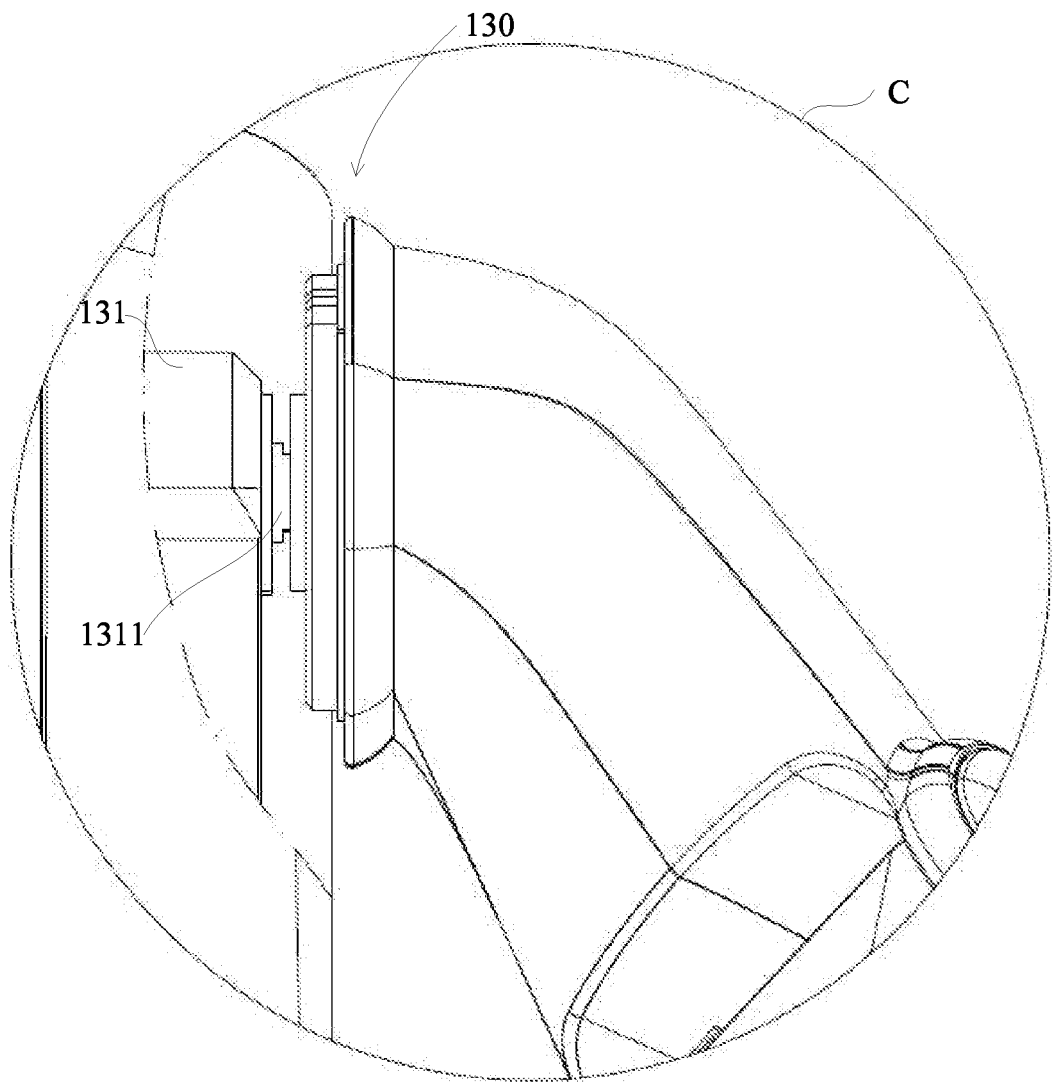
FIG. 1C is an enlarged view of a circle portion C of FIG. 1B.

FIG. 1A is a schematic block diagram of three important components of a robot according to an embodiment of the present disclosure; FIG. 1B is a schematic view of a robot, which is partly cut to show a servo of a joint: FIG. 1C is an enlarged view of a circle portion C of FIG. 1B. For better illustrating the embodiments of the present disclosure, three important parts for controlling the movement of one joint of a robot 100 are first introduced. When the robot 100 performs a complicated motion, multiple joints may be required for performing combined motion. As shown in FIG. 1A-FIG. 1C, the three important parts are: a robot server 110, a robot joint control system 120, and a robot joint 130, in which the robot joint 130 includes a servo 131. When the robot server 110 is to control the robot joint 130 to perform a motion within a specified period of time, that is, when an output shaft 1311 of the servo 131 is to be controlled to rotate from a current rotational angle to a specified target rotational angle within a specified period of time, the robot server 110 will transmit a control instruction to the robot joint control system 120. As used therein, for example, the control instruction may be an instruction to rotate the output shaft 1311 of the servo 131 to the target rotational angle in the period of time. After receiving the control instruction, the current rotational angle of the output shaft 1311 of the controlled servo 131 is obtained first, then a rotation path of the robot joint 130 is calculated based on the target rotational angle and the period of time in the control instruction, and finally the output shaft 1311 of the servo 131 is controlled to rotate according to the rotation path. For example, during a time T1, the robot joint 130 is controlled to rotate from angle $a_1$ to angle $a_2$. The technical solution of the present disclosure will be described below by way of specific embodiments.

Embodiment 1

Figure 2:
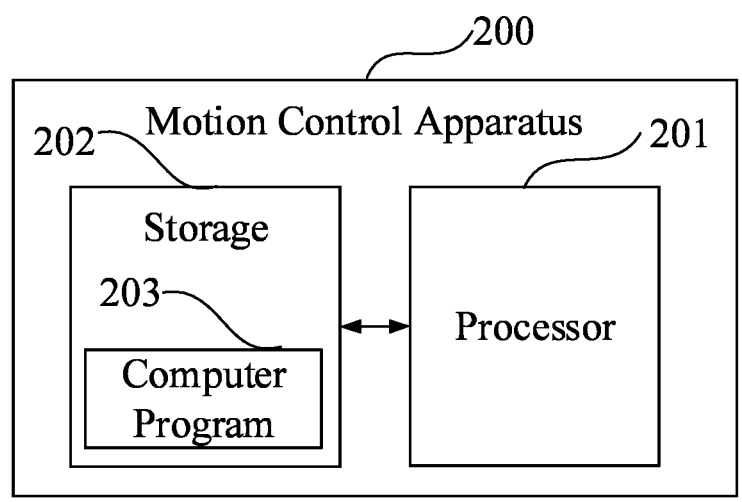
FIG. 2 is a schematic block diagram of an embodiment of a motion control apparatus for a robot according to the present disclosure.

FIG. 2 is a schematic block diagram of an embodiment of a motion control apparatus 200 for a robot according to the present disclosure. As shown in FIG. 2, in Embodiment 1, the motion control apparatus 200 for a servo of a robot includes an obtaining unit 210, a calculating unit 220, and a controlling unit 230. Each of the above-mentioned units may be implemented in the form of hardware (e.g., a circuit), software (e.g., a program), or a combination thereof (e.g., a circuit with a single chip microcomputer). The apparatus 200 may include one or more processors 201, a storage 202 (e.g., a memory), and one or more computer programs 203 stored in the storage 202 and executed by the processor 201, where the one or more computer programs 203 include the above-mentioned units. The apparatus 200 is installed in a robot with a servo. The servo is driven by a motor, and may be used as a joint of the robot so as to realize the movement of a limb of the robot which connected to the joint. The movement of the servo specifically means the rotation of an output shaft of the servo which is driven by the motor.

The obtaining unit 210 is configured to obtain a first rotational angle $P_1$ of an output shaft of the servo currently at, a second rotational angle $P_2$ for the output shaft of the servo to reach, a first time $T_1$ for the output shaft of the servo to perform each rotation, and a second time $T_2$ for the output shaft of the servo to rotate from the first rotational angle $P_1$ to the second rotational angle $P_2$. The rotation from the first rotational angle $P_1$ to the second rotational angle $P_2$ is divided into N times with each time rotating a determined number of degrees.

The calculating unit 220 is configured to calculate a motion curve B(t) of the output shaft of the servo based on the first rotational angle $P_1$, the second rotational angle $P_2$, the first time $T_1$, and the second time $T_2$, where the motion curve B(t) indicates every reached rotational angle of the output shaft of the servo during the second time $T_2$; the slope of each point on the motion curve B(t) has the same sign as a first slope $K_1$, where the first slope $K_1$ is the slope of uniform motion determined based on the second rotational angle $P_2$, the first rotational angle $P_1$, the second time $T_2$, and the first time $T_1$; and an absolute value of the slope of the motion curve B(t) at a start rotation phase and an end rotation phase of the servo is less than an absolute value of the first slope $K_1$.

The controlling unit 230 is configured to control the servo to rotate according to the motion curve B(t).

Since the rotation of the output shaft of the servo of the robot is usually performed at a constant speed, when the servo of the robot starts to rotate and ends the rotation, it is easy to cause the robot to lose its gravity center and fall due to the speed changes much and fast. This embodiment provides a motion control apparatus for a robot, which re-plans the rotation path of the servo, converts the original constant speed straight rotation path into a curved rotation path, so that the robot has a less speed and speed change in the beginning and the ending of rotation, which reduces the possibility of the falling of the robot due to instability in the gravity center caused by a sudden change in speed.

In this embodiment, the calculating unit 220 includes: an angle threshold calculating unit configured to set an angle threshold Y based on the first rotational angle $P_1$ and the second rotational angle $P_2$; an intermediate angle calculating unit configured to determine a third rotational angle $P_3$ based on a sum of the first rotational angle $P_1$ and the angle threshold Y, and determine a fourth rotational angle $P_4$ based on a difference between the second rotational angle $P_2$ and the angle threshold; a rotation number calculating unit configured to determine a first number N of the motion curve B(t) through dividing the second time $T_2$ by the first time $T_1$, where the first number N is a total rotation number for the output shaft of the servo to rotate from the first rotational angle $P_1$ to the second rotational angle $P_2$; and a motion curve calculating unit configured to calculate the motion curve B(t) of the output shaft of the servo based on the first rotational angle $P_1$, the second rotational angle $P_2$, the third rotational angle $P_3$, the fourth rotational angle $P_4$, and the first number N through the following formula:

$$B(t) = (1-t)^3 \times P_1 + 3(1-t)^2 \times t \times P_3 + 3(1-t) \times t^2 \times P_4 + t^3 \times P_2$$

$$n \in [1, N], t = \frac{n}{N}.$$

In this embodiment, the angle threshold calculating unit includes: a difference calculating unit configured to calculate a difference between the second rotational angle $P_2$ and the first rotational angle $P_1$; and a threshold setting unit configured to set the angle threshold Y, where the angle threshold Y is not greater than 10% of the difference.

It should be noted that, the motion control apparatus for a robot in the second embodiment of the present disclosure and the motion control method for a robot in the first embodiment of the present disclosure are based on the same inventive concept, and the corresponding technical contents in the apparatus (device) embodiments and method embodiments can be applied to each other, which will not be detailed herein.

Embodiment 2

Figure 3:
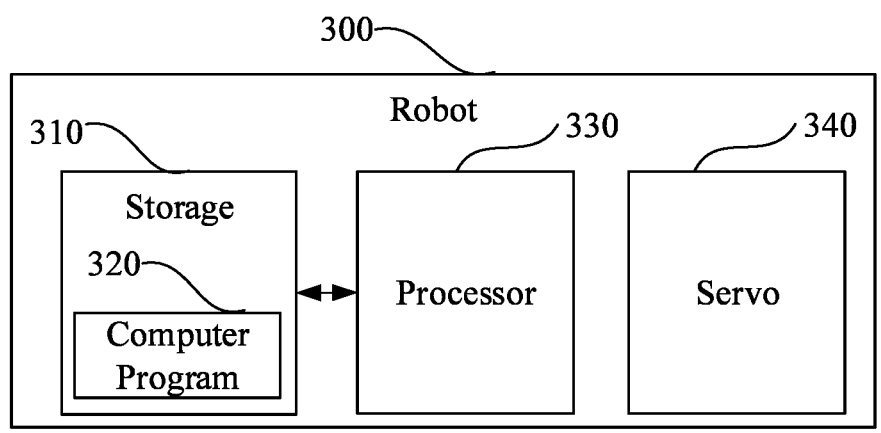
FIG. 3 is a schematic block diagram of an embodiment of a robot according to the present disclosure.

FIG. 3 is a schematic block diagram of an embodiment of a robot 300 according to the present disclosure. As shown in FIG. 3, in Embodiment 2, the robot 300 includes a processor 330, a storage 310 (e.g., a memory), a computer program 320 stored in the storage 310 and executable on the processor 330, and at least a servo 340. The computer program 320 includes instructions for implementing the steps in a motion control method or the functional units in a motion control apparatus. When the processor 330 executes (the instructions in) the computer program 320, the steps in an embodiment of a motion control method for a robot such as steps S101-S103 shown in FIG. 4 are implemented, or the functions of the units in an embodiment of a motion control apparatus 200 for a robot such as the units 210-230 shown in FIG. 2 are implemented. The servo 340 is driven by a motor, and may be used as a joint of the robot so as to realize the movement of a limb of the robot which connected to the joint, where the movement of the servo 340 specifically means the rotation of an output shaft of the servo 340 which is driven by the motor.

Exemplarily, the computer program 320 can be divided into one or more units, where the one or more units are stored in the storage 310 and executed by the processor 330 so as to implement the present disclosure. The one or more units may be a series of computer program instruction segments capable of performing a particular function, where the instruction segments for describing the execution process of the computer program 320 in the robot 300. For example, the computer program 320 can be divided into an obtaining unit, a calculating unit and a controlling unit, and the specific functions of each unit are as follows:

the obtaining unit is configured to obtain a first rotational angle $P_1$ of an output shaft of the servo currently at and a first time $T_1$ for the output shaft of the servo to perform one rotation, and obtain a second rotational angle $P_2$ for the output shaft of the servo to reach and a second time $T_2$ for the output shaft of the servo to rotate from the first rotational angle $P_1$ to the second rotational angle $P_2$;

the calculating unit is configured to calculate a motion curve B(t) of the output shaft of the servo based on the first rotational angle $P_1$, the second rotational angle $P_2$, the first time $T_1$, and the second time $T_2$, where the motion curve B(t) indicates every reached rotational angle of the output shaft of the servo during the second time $T_2$; the slope of each point on the motion curve B(t) has the same sign as a first slope $K_1$, where the first slope $K_1$ is the slope of uniform motion determined based on the second rotational angle $P_2$, the first rotational angle $P_1$, the second time $T_2$, and the first time $T_1$; and an absolute value of the slope of the motion curve B(t) at a start rotation phase and an end rotation phase of the servo is less than an absolute value of the first slope $K_1$; and the controlling unit is configured to control the servo to rotate according to the motion curve B(t).

It can be understood by those skilled in the art that FIG. 3 is merely an example of the robot 300 and does not constitute a limitation on the robot 300, and may include more or fewer components than those shown in the figure, or a combination of some components or different components.

The processor 330 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 310 may be an internal storage unit of the robot 300, for example, a hard disk or a memory of the robot 300. The storage 310 may also be an external storage device of the robot 300, for example, a plug-in hard disk, a smart media card (SMC), a secure digital (SD) card, flash card, and the like, which is equipped on the robot 300. Furthermore, the storage 310 may further include both an internal storage unit and an external storage device, of the robot 300. The storage 310 is configured to store the computer program and other programs and data required by the robot 300. The storage 310 may also be used to temporarily store data that has been or will be output.

Embodiment 3

FIG. 4 is a flow chart of an embodiment of a motion control method for a robot according to the present disclosure. The motion control method is applied to a servo of a robot, where the servo is driven by a motor, and may be used as a joint of the robot so as to realize the movement of a limb of the robot which connected to the joint. In this embodiment, the method is a computer-implemented method executable for a processor, which may be implemented through a motion control apparatus for a robot shown in FIG. 2. As shown in FIG. 4, the method includes the following steps.

S101: obtaining a first rotational angle $P_1$ of an output shaft of the servo of the robot currently at and a first time $T_1$ for the output shaft of the servo to perform one rotation, and obtaining a second rotational angle $P_2$ for the output shaft of the servo to reach and a second time $T_2$ for the output shaft of the servo to rotate from the first rotational angle $P_1$ to the second rotational angle $P_2$.

One rotation refers to the rotation of the output shaft of the servo made in response to a control instruction. In this embodiment, the first rotational angle $P_1$ at which the servo of the robot is currently located and the first time $T_1$ required for the output shaft of the servo to perform one rotation are obtained.

The movement of the robot is realized by the rotation of the output shaft of the servo of the robot. By controlling the servo of the robot to rotate, the robot can present postures such as walking and dancing. In which, the servo is a position servo drive, which includes a motor, a reducer and an output shaft. To enable the servo to rotate is to enable the output shaft to rotate. Except for supplying power to a circuit of the servo, it also needs to apply a target position instruction to enable the output shaft of the servo to rotate to an angle specified by the target position instruction. At the same time, the rotation direction of the servo is also fixed, that is, a servo can only rotate in a left-right direction or a front-rear direction, for example, controlling an arm of the robot to swing from left to right or from front to back through the servo. In the case of performing a more complex turning motion (one turning motion includes a plurality of rotations, where each of the rotations refers to the rotation of the output shaft of the servo made in response to a control instruction), for example, controlling the arm of the robot to rotate to the front left, two servos are required. In addition, the rotational angle of the output shaft of the servo is also limited, and the maximum rotational angles of output shafts of servos in different joints are different. A first rotational angle $P_1$ at which the servo of the robot is currently located is obtained, where the first rotational angle $P_1$ is an angle at which the servo is located before the servo begins to rotate.

During the rotation of the servo, the rotation from a starting angle to a target angle usually needs multiple rotations, that is, the rotation from the first rotational angle $P_1$ to the second rotational angle $P_2$ usually needs multiple rotations, and the first time $T_1$ indicates the time needed for the output shaft of the servo to perform one rotation di during an actual rotation. In this embodiment, the first time $T_1$ is equal to a servo response time $t_1$ of the servo, where the servo response time $t_1$ is the minimum time needed for the output shaft of the servo to perform one rotation di operation, and the servo response time $t_1$ is determined by a servo processor of the servo. Due to different servo processor having different performance, the servo response time $t_1$ depends on the adopted servo processor. The first time $T_1$ can be set according to the servo response time $t_1$ and the actual demand. If the first time $T_1$ is greater than the servo response time $t_1$, it takes a longer time for the output shaft of the servo to rotate once, which makes the robot look slower. In general, the robot is expected to be able to complete a turning motion or a rotation quickly and flexibly, rather than slowly completing a turning motion or a rotation. Hence, as long as it is within a range which the servo can respond in time, that is, the time for the output shaft of the servo to complete one rotation is not less than the servo response time $t_1$ and as close as possible to the servo response time $t_1$, the servos can respond normally. Conversely, if the first time $T_1$ is less than the servo response time $t_1$, it is clear that the servo will not be able to complete the rotation di during the first time $T_1$, which depends on the performance of the servo processor. Since the servo response time $t_1$ is the minimum time required for the output shaft of the servo to perform a rotation, if the first time $T_1$ is less than the servo response time $t_1$, it is likely that a servo control system of the servo manages to control the servo to complete one rotation within the first time $T_1$ while the servo processor limits the servo to realize such a rapid rotation, which results in damage to the servo. Therefore, in this embodiment, the first time $T_1$ is equal to the servo response time $t_1$, so as to guarantee that the servo of the robot can safely complete one rotation in the shortest time, so that the servo can reach the target angle in a fast and safe manner after multiple rotations.

In this embodiment, a second rotational angle $P_2$ that requires the servo to reach and a second time $T_2$ for the output shaft of the servo to rotate from the first rotational angle $P_1$ to the second rotational angle $P_2$ are obtained.

Figure 5:
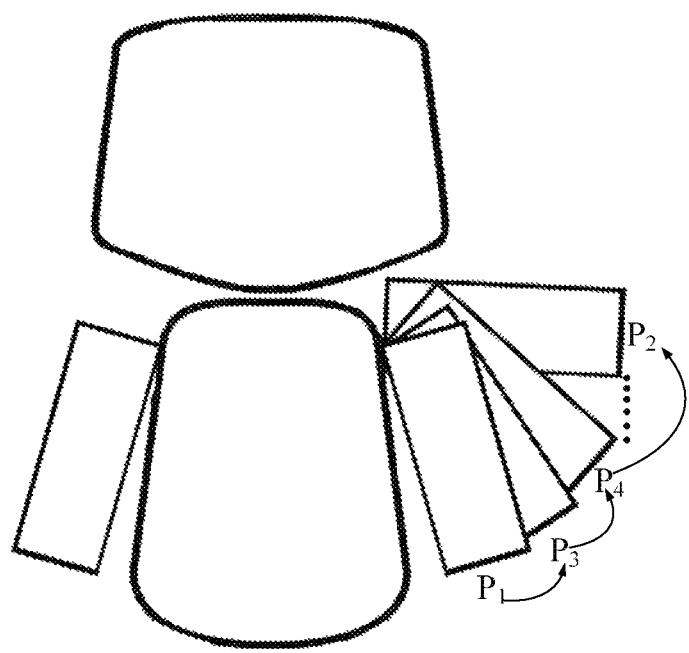
FIG. 5 is a schematic block diagram of a relationship between one rotation and one turning motion of a servo of a robot according to an embodiment of the present disclosure.

The second rotational angle $P_2$ that requires the servo to reach is obtained, where the second rotational angle $P_2$ is a target angle to be reached by the servo to complete a turning motion. In which, one turning motion of the servo includes multiple rotations. FIG. 5 is a schematic block diagram of a relationship between one rotation and one turning motion of a servo of a robot according to an embodiment of the present disclosure. As shown in FIG. 5, the rotation of the output shaft of the servo of the robot from the first rotational angle $P_1$ to the second rotational angle $P_2$ can not be completed in one rotation, which needs multiple rotations, that is, the servo needs to be rotated from the first rotational angle $P_1$ to an intermediate rotational angle $P_3$ first, and rotated from the intermediate rotational angle $P_3$ to another intermediate rotational angle $P_4$, and finally reach the target angle, that is, the second rotational angle $P_2$, through multiple rotations.

The second time $T_2$ for the output shaft of the servo to rotate from the first rotational angle $P_1$ to the second rotational angle $P_2$ is set. In which, the second time $T_2$ is the total time required for the output shaft of the servo to complete a certain motion, for example, if the total time for the output shaft of the servo to complete a certain motion, that is, the second time $T_2$, is set as 1 second, and the first time $T_1$ required for the output shaft of the servo to complete one rotation is 20 milliseconds, where 1 second is equal to 1000 milliseconds, and the number of rotations for the output shaft of the servo to complete the motion is $T_2/T_1=50$, that is, the servo needs to be rotated 50 times to complete the motion.

S102: calculating a motion curve $B(t)$ of the output shaft of the servo based on the first rotational angle $P_1$, the second rotational angle $P_2$, the first time $T_1$, and the second time $T_2$.

Figure 6A:
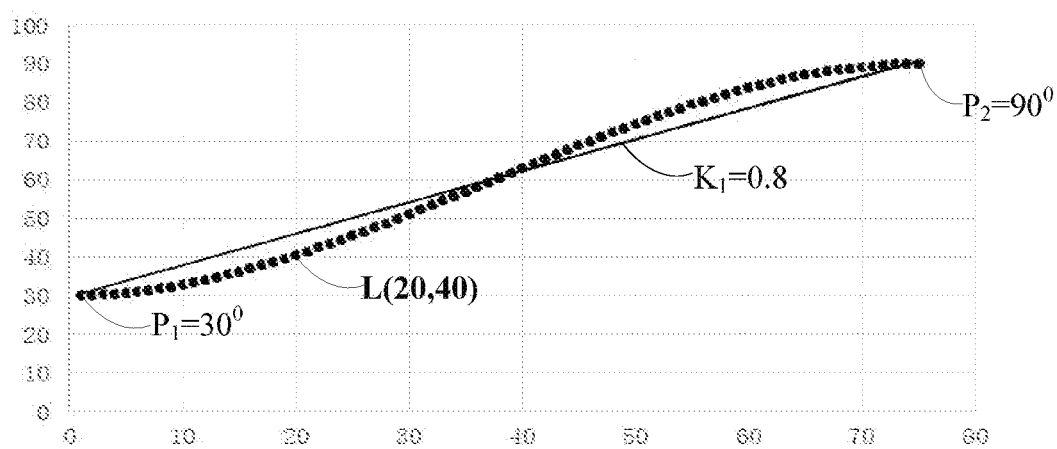
FIG. 6A-FIG. 6B are schematic block diagrams of a motion curve B(t) according to an embodiment of the present disclosure.
Figure 6B:
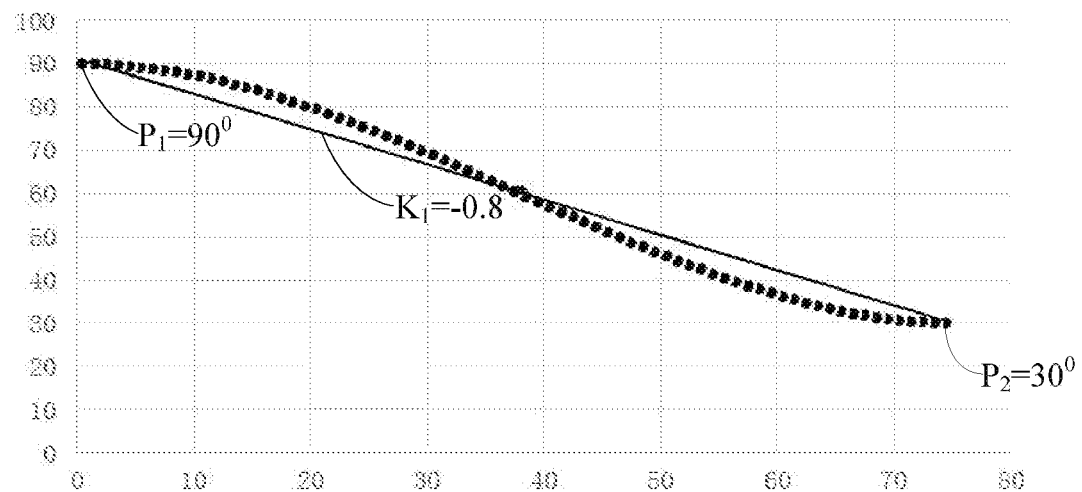

In this embodiment, the motion curve $B(t)$ is a rotation curve of the servo, and the servo will be rotate according to a path planned by the rotation curve $B(t)$. FIG. 6A-FIG. 6B are schematic block diagrams of a motion curve $B(t)$ according to an embodiment of the present disclosure, which is only an example of the shape of the motion curve, and the shape of the motion curve eventually obtained through calculation is depended on the set parameter(s) in the motion curve $B(t)$. As shown in FIG. 6A-FIG. 6B, the horizontal axis represents the time with the unit of 20 milliseconds (ms), for example, the specific time indicated by the time of 10 is 10*20 ms=200 ms, and the vertical axis represents the angle with the unit of 1°, that is, the motion curve $B(t)$ is used to indicate the angle to which the servo is moved at each time within the second time $T_2$, for example, the point L indicates that the servo is at the angle of 40° at the time 20*20 ms=400 ms.

The slope of each point on the motion curve $B(t)$ has the same sign as a first slope $K_1$, and the first slope $K_1$ is a slope when the servo is at a constant speed motion which is determined based on the second rotational angle $P_2$, the first rotational angle $P_1$, the second time $T_2$, and the first time $T_1$, and an absolute value of the slope of the motion curve $B(t)$ when the servo is at a start rotation phase and an end rotation phase is less than an absolute value of the first slope $K_1$. In which, the constant speed motion of the servo refers to the angle of each rotation of the output shaft of the servo changes uniformly with time; the start rotation phase of the servo refers to a period of time after the servo begins to move from the current position, and the length of the time is not specifically limited; the end rotation phase refers to a period of time at and before the end of the movement of the servo, and the length of the time is not specifically limited. For example, as shown in FIG. 6A, if the first rotational angle $P_1$ is 30°, the second rotational angle $P_2$ is 90°, the first time $T_1$ is 20 milliseconds, and the second time $T_2$ is 1.5 seconds (1500 milliseconds), the rotation number $N=(T_2/T_1)=75$ is calculated through the first time $T_1$ and the second time $T_2$ first, that is, the rotation from the first rotational angle $P_1$ to the second rotational angle $P_2$ needs 75 rotations, and then the first slope $K_1$ when the servo is at the constant speed motion $(P_2-P_1)/N=(90-30)/75=0.8$ (degrees/time) is calculated based on the second rotational angle $P_2$, the first rotational angle $P_1$, and the rotation number N, that is, 0.8° per rotation. In addition, the slope of the first slope $K_1$ is a positive value, hence the slope of each point on the motion curve $B(t)$ is positive. For another example, as shown in FIG. 6B, if the first rotational angle $P_1$ is 90°, the second rotational angle $P_2$ is 30°, the first time $T_1$ is 20 milliseconds, and the second time $T_2$ is 1.5 seconds (1500 milliseconds), the rotation number $N=(T_2/T_1)=75$ is calculated through the first time $T_1$ and the second time $T_2$ first, that is, the rotation from the first rotational angle $P_1$ to the second rotational angle $P_2$ needs 75 times of rotations, and then the first slope $K_1$ when the servo is at the constant speed motion $(P_2-P_1)/N=(30-90)/75=-0.8$ (degrees/time) is calculated based on the second rotational angle $P_2$, the first rotational angle $P_1$, and the rotation number N, that is, 0.8° per rotation. In addition, the slope of the first slope $K_1$ is a negative value, hence the slope of each point on the motion curve $B(t)$ is negative. Assume that the start rotation phase is the period from the time 0 to the time 10, and the end motion phase is the period from the time 75 to the time 65, then regardless of whether the value of the first slope $K_1$ is positive or negative, it can be seen from FIG. 6A-FIG. 6B that the absolute value of the slope of the motion curve $B(t)$ when the servo is at the start motion phase and the end motion phase is less than the absolute value of the first slope $K_1$ of 0.8.

S103: controlling the output shaft of the servo to rotate according to the motion curve $B(t)$.

Based on the calculated motion curve $B(t)$, the servo is controlled to rotate according to the rotation path planned by the motion curve $B(t)$. Since the absolute value of the slope of the motion curve $B(t)$ when the servo is at the start motion phase and the end motion phase is less than the absolute value of the first slope $K_1$, when the servo starts motion and ends motion, the robot will not fall due to the speed suddenly dropping to zero.

Since the rotation of the output shaft of the servo of the robot is usually performed at a constant speed, when the servo of the robot starts to rotate and ends the rotation, it is easy to cause the robot to lose its gravity center and fall due to the speed changes much and fast. This embodiment provides a motion control method for a robot, which re-plans the rotation path of the servo, converts the original constant speed straight rotation path into a curved rotation path, so that the robot has a less speed and speed change in the beginning and the ending of rotation, which reduces the possibility of the falling of the robot due to instability in the gravity center caused by a sudden change in speed.

In one embodiment, the motion curve $B(t)$ includes a slope increase phase and a slope decrease phase. The method further includes setting the slope increase phase and the slope decrease phase according to a change trend of an absolute value of the slope of the points on the motion curve B(t), where: in the slope increase phase, a difference between an absolute value of the slope of any current point on the motion curve B(t) and an absolute value of the slope of its next point is negative, and the difference is greater than the first threshold value $V_1$; and in the slope decrease phase, a difference between an absolute value of the slope of any current point on the motion curve B(t) and an absolute value of the slope of its next point is positive, and the difference is less than the second threshold value $V_2$.

The first threshold value $V_1$ and the second threshold value $V_2$ are values for controlling that the motion curve B(t) does not appear a large abrupt change, that is, by setting the first threshold value $V_1$ and the second threshold value $V_2$, the absolute value of the slope of the motion curve B(t) gradually increases first, and then gradually decreases. The values of the first threshold $V_1$ and the second threshold $V_2$ are relatively small values, and may be set according to the specific conditions of the servo such as the servo response time $t_1$ or the maximum rotational angle of the output shaft of the servo. The absolute values of the first threshold $V_1$ and the second threshold $V_2$ may or may not be equal. For example, if the first threshold $V_1$ is set to −0.1, and the second threshold $V_2$ is set to 0.1; in the slope increase phase, the absolute value of the slope of a point $P_n$ on the motion curve B(t) is 0.2, the absolute value of the slope of the next point $P_{n+1}$ is 0.26, and the difference of the absolute values of the slopes of the two points is −0.06, which is greater than the first threshold $V_1$; in the slope decrease phase, the absolute value of the slope of a point $P_n$ on the motion curve B(t) is 0.26, the absolute value of the slope of the next point $P_{n+1}$ is 0.2, and the difference of the absolute values of the slopes of the two points is 0.06, which is less than the second threshold $V_2$.

In this embodiment, the step S102 of calculating the motion curve B(t) of the output shaft of the servo based on the first rotational angle $P_1$, the second rotational angle $P_2$, the first time $T_1$, and the second time $T_2$ includes: calculating the motion curve B(t) of the output shaft of the servo by using the Bezier curve algorithm based on the first rotational angle $P_1$, the second rotational angle $P_2$, the first time $T_1$, and the second time $T_2$.

There are many algorithms for calculating the motion curve B(t), for example, the trapezoidal curve algorithm and the S-curve algorithm. However, it will be more complicated to obtain the motion curve B(t) with the above-mentioned characteristics via the S-curve algorithm, and it will also do not have a good effect to obtain the motion curve B(t) with the above-mentioned characteristics via the trapezoidal curve algorithm. Therefore, in the case of taking the effects and complexity of the algorithm into account, in this embodiment, the Bezier curve algorithm is adopted to calculate the motion curve B(t). The Bezier curve algorithm is a simple algorithm for determining curves, which can be used to draw a smooth curve based on four points. In which, the four points include: starting point $X_1$, target point $X_4$, and two intermediate control points $X_2$ and $X_3$, where the starting point $X_1$ and the target point $X_4$ are two constants, and the two intermediate control points $X_2$ and $X_3$ are variables, and the shape of the Bezier curve can be changed by changing the values of $X_2$ and $X_3$. The calculation formula for Bessel third-order curve is as follows:

$$B(t)=(1-t)^3 \times X_1+3(1-t)^2 \times t \times X_2+3(1-t) \times t^2 \times X_3+t^3 \times X_4 t \in [0,1].$$

In this embodiment, the starting point is the first rotational angle $P_0$, the target point is the second rotational angle $P_2$, and the two control points are set to $P_3$ and $P_4$, where the values of the two control points $P_3$ and $P_4$ are also angle values, then calculating the motion curve B(t) of the output shaft of the servo based on the first rotational angle $P_1$, the second rotational angle $P_2$, the first time $T_1$, and the second time $T_2$ includes:

Step 1: setting an angle threshold Y based on the first rotational angle $P_1$ and the second rotational angle $P_2$.

The angle threshold Y is used to calculate the angles of the two control points $P_3$ and $P_4$, which can be set according to specific conditions. The sizes of the control points $P_3$ and $P_4$ obtained through different angle thresholds Y are different, thus the shapes of the obtained motion curves B(t) are different. In this embodiment, regardless of whether the angle threshold Y is set, as long as the motion curve that eventually obtained by calculation has the characteristics described above.

Step 2, determining a third rotational angle $P_3$ based on a sum of the first rotational angle $P_1$ and the angle threshold Y, and determining a fourth rotational angle $P_4$ based on a difference between the second rotational angle $P_2$ and the angle threshold.

Figure 7:
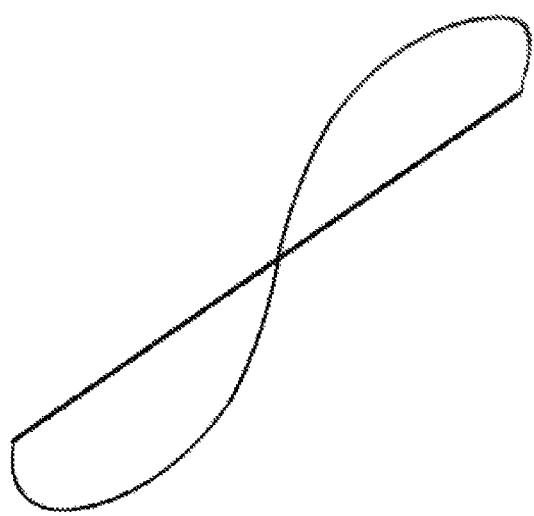
FIG. 7 is a schematic block diagram of a change trend of the motion curve B(t).
Figure 8A:
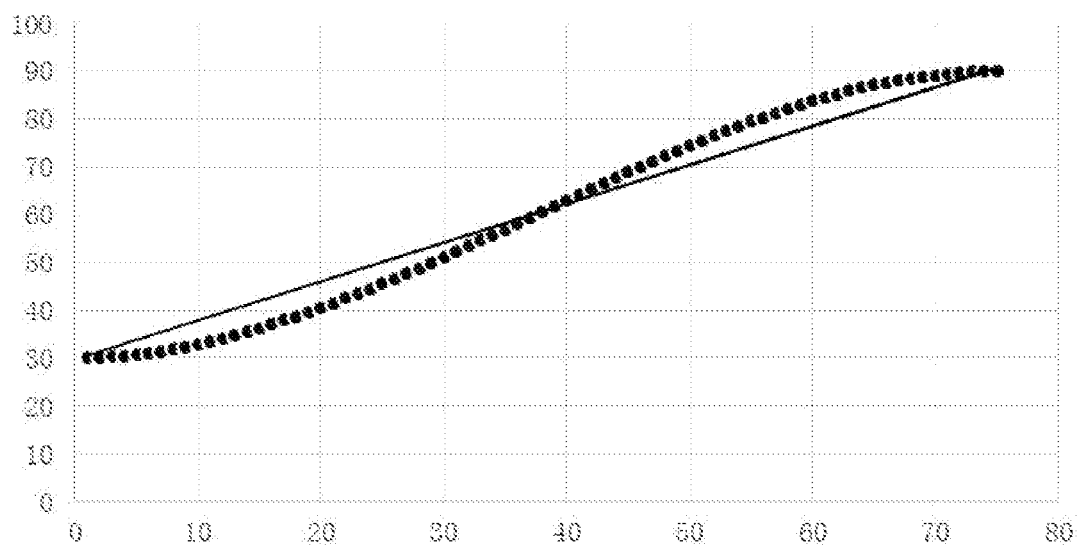
FIG. 8A-FIG. 8E are schematic block diagrams of the influence of setting different angle thresholds Y on the shape of the motion curve B(t).
Figure 8B:
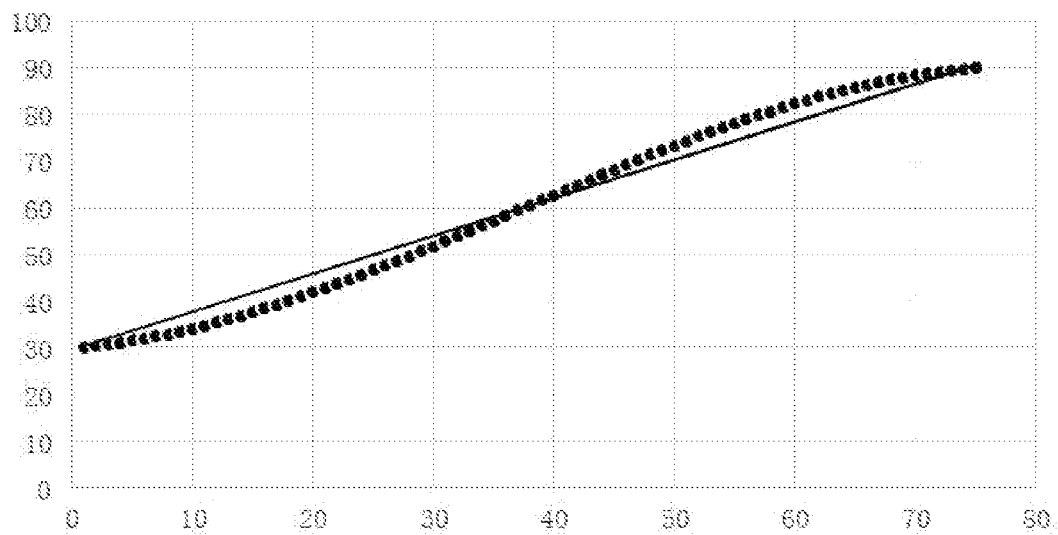
Figure 8C:
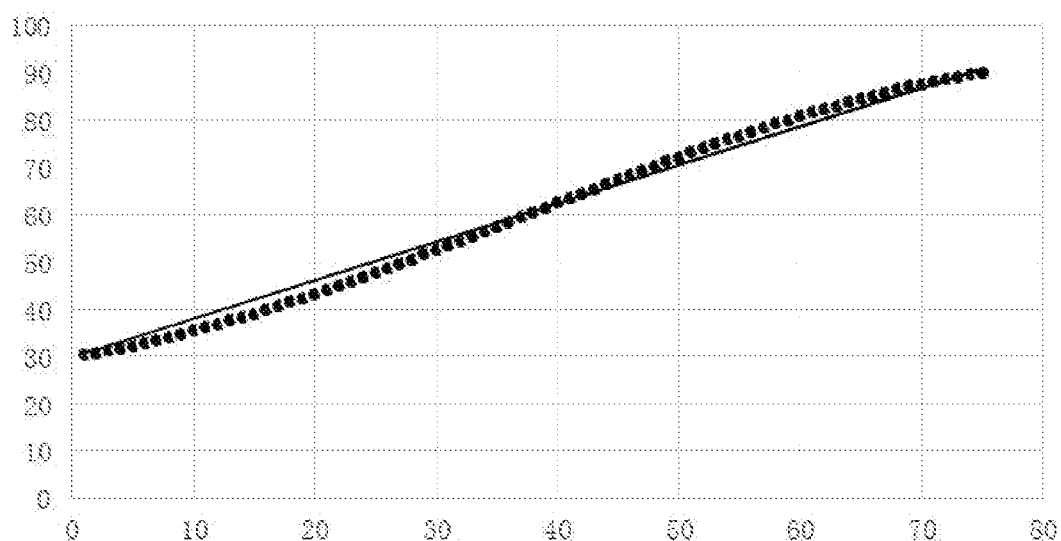
Figure 8D:
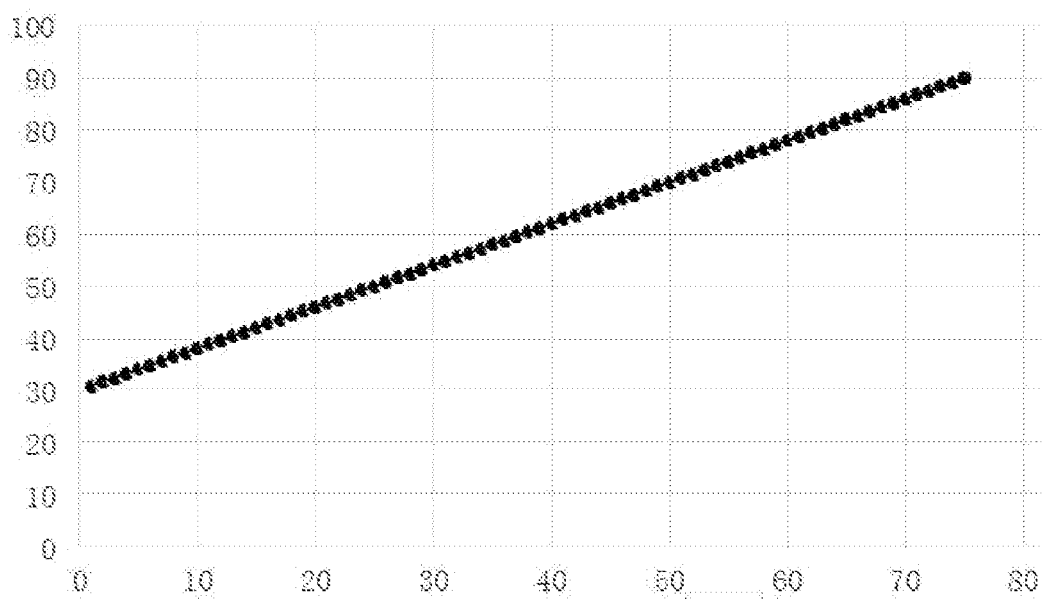
Figure 8E:
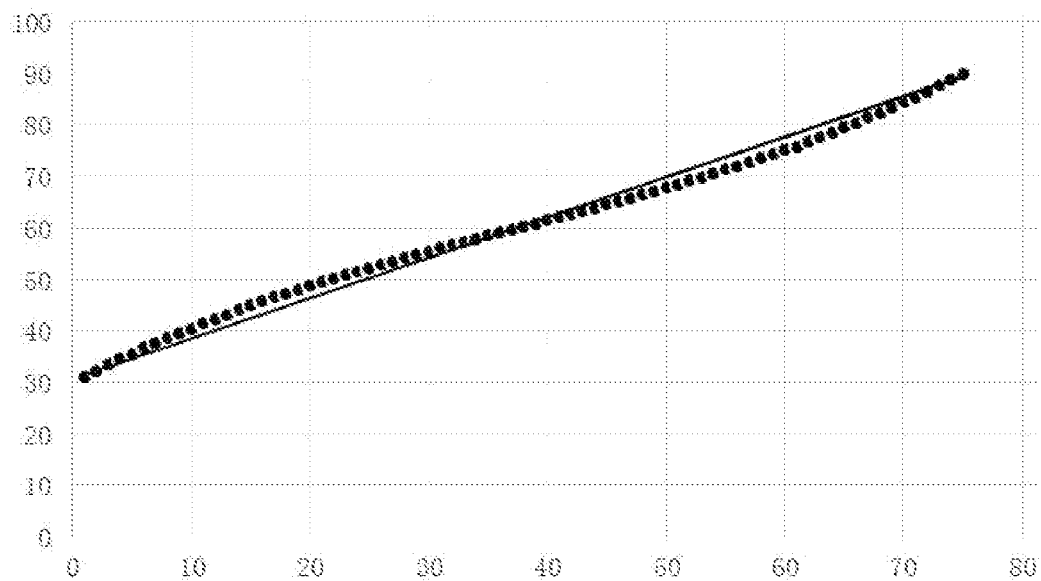

In this embodiment, in order to make the starting point to gradually approach the target point, it is necessary to set the values of the two control points $P_3$ and $P_4$ as the intermediate values of the starting point $P_1$ and the target point $P_2$, that is, $P_3>P_1$, $P_4<P_2$. If the values of the two control points $P_3$ and $P_4$ are the values of two sides of the starting point and the target point, that is, $P_3<P_1$, $P_4>P_2$, then the obtained motion curve is likely to be far away from the target point first, that is, the absolute value of the slope is gradually reduced first, and then approaches the target point, that is, the absolute value of the slope gradually is increased first, and then approaches the target point after circling around the target point. At this time, the absolute value of the slope may first decrease and then increase, the specific change trend is shown in FIG. 7. It can be seen that such a curve does not have the characteristics of the motion curve B(t) required in this embodiment. Therefore, in this embodiment, the third rotational angle $P_3$ is determined based on the sum of the first rotational angle $P_1$ and the angle threshold Y, and the fourth rotational angle $P_4$ is determined according to the difference between the second rotational angle $P_2$ and the angle threshold Y, so as to ensure the calculated values of the two control points are the values between the starting point $P_1$ and the target point $P_2$. For one example, the first rotational angle $P_1$ is 30°, and the second rotational angle $P_2$ is 90°. The angle threshold Y is set to 30 according to $P_1$ and $P_2$, and then the third rotational angle $P_3$ is determined as 33° according to the sum of the first rotational angle $P_1$ and the angle threshold Y, and the fourth rotational angle $P_4$ is determined as 87° according to the difference between the second rotational angle $P_2$ and the angle threshold Y. For another example, the first rotational angle $P_1$ is 90°, and the second rotational angle $P_2$ is 30°. The angle threshold Y is set to −3° according to $P_1$ and $P_2$, and then the third rotational angle $P_3$ is determined as 87° according to the sum of the first rotational angle $P_1$ and the angle threshold Y, and the fourth rotational angle $P_4$ is determined as 33° according to the difference between the second rotational angle $P_2$ and the angle threshold Y.

Step 3: determining a first number N of the motion curve B(t) through dividing the second time $T_2$ by the first time $T_1$.

The first number N is a total rotation number for the output shaft of the servo to rotate from the first rotational angle $P_1$ to the second rotational angle $P_2$. For example, the second time $T_2$ is 1 second, and the first time $T_1$ is 20 milliseconds, then the first number N is $T_2/T_1=50$, that is, the first number N is 50.

Step 4: calculating the motion curve B(t) of the output shaft of the servo based on the first rotational angle $P_1$, the second rotational angle $P_2$, the third rotational angle $P_3$, the fourth rotational angle $P_4$, and the first number N through the following formula:

$$B(t) = (1-t)^3 \times P_1 + 3(1-t)^2 \times t \times P_3 + 3(1-t) \times t^2 \times P_4 + t^3 \times P_2$$

$$n \in [1, N], t = \frac{n}{N};$$

where, t is the time corresponding to the nth rotation, which is the normalized time, $t=(n\,T_1)/T_2=n/N$, and $t\in[0, 1]$.

In this embodiment, the angle threshold Y is set through the first rotational angle $P_1$ and the second rotational angle $P_2$, and then the values of the two control points $P_3$ and $P_4$ are obtained based on the angle threshold Y, and then the shape of the motion curve B(t) is controlled based on the values of $P_3$ and $P_4$.

Preferably, the step of setting the angle threshold Y based on the first rotational angle $P_1$ and the second rotational angle $P_2$ includes: calculating a difference between the second rotational angle $P_2$ and the first rotational angle $P_1$; and setting the angle threshold Y, where the angle threshold Y is not greater than 10% of the difference.

In this embodiment, the value of the angle threshold Y is set to not exceed 10% of the difference between $P_2$ and $P_1$. There is no limit to the magnitude relationship between $P_2$ and $P_1$, that is, $P_2$ may be greater than $P_1$ or less than $P_1$, that is, the turning motion of the servo may be from a small angle to a large angle, or from a large angle to a small angle. For example, if the first rotational angle $P_1$ is 30° and the second rotational angle $P_2$ is 90°, the difference between $P_2$ and $P_1$ is 60°, and the maximum value of the calculated angle threshold Y is 6, that is, the optional range of the value of the angle threshold Y is [0°, 6°]; alternatively, if the first rotational angle $P_1$ is 90°, and the second rotational angle $P_2$ is 30°, the difference between $P_2$ and $P_1$ is −60°, and the maximum value of the calculated angle threshold Y is −6°. At the time, the optional range of the value of the angle threshold Y is [−6°, 0°]. If the value of the angle threshold Y is greater than 10% of the difference between $P_2$ and $P_1$, the speed change of the obtained motion curve B(t) during the start motion phase and the end motion phase of the servo will be greater, and the speed change during the start motion phase and the end motion phase of the servo will increase as the ratio increases. FIG. 8A-FIG. 8E are schematic block diagrams of the influence of setting different angle thresholds Y on the shape of the motion curve B(t), which respectively show the trends of the change of the motion curve B(t) calculated based on different angle thresholds Y. In which, the four angles $P_1$-$P_4$ and the angle thresholds Y in FIG. 8A-FIG. 8E are:

| $P_1$-$P_4$ in FIG. 8A-FIG. 8E | Angle threshold Y |
|---|---|
| $P_1$: 30, $P_3$: 30, $P_4$: 90, $P_2$: 90 | 0 |
| $P_0$: 30, $P_1$: 35, $P_2$: 85, $P_3$: 90 | 5 |
| $P_0$: 30, $P_1$: 40, $P_2$: 80, $P_3$: 90 | 10 |
| $P_0$: 30, $P_1$: 50, $P_2$: 70, $P_3$: 90 | 20 |
| $P_0$: 30, $P_1$: 60, $P_2$: 60, $P_3$: 90 | 30 |

It can be seen from FIG. 8A-FIG. 8E that, if the angle thresholds Y are 0 and 5, the absolute values of the slope of the motion curve B(t) at the start motion phase and the end motion phase of the servo which is calculated based on $P_1$-$P_4$ are less than the first slope value $K_1$, and the difference therebetween is large, that is, in comparison with uniform motion, the speed change of the robot in these two phases is relatively small. As the angle threshold Y increases, the absolute value of the slope of the motion curve B(t) obtained based on $P_1$-$P_4$ which is at the start rotation phase and the end rotation phase of the servo begins to increase, and gradually approaches the first slope $K_1$. When the angle threshold Y is 20, the obtained value of $P_1$-$P_4$ changes in an equal difference, and the obtained motion curve B(t) coincides with the straight line of uniform motion. If the angle threshold Y is 30, the obtained values of $P_2$ and $P_3$ are equal, and the change of the speed of the motion curve B(t) at the start rotation phase and the end rotation phase of the servo is relatively large and has exceeded the first slope $K_1$. It can be seen that, as the angle threshold increases, the absolute value of the slope of the points of the motion curve B(t) at the start rotation phase and the end rotation phase of the servo will increase. At the same time, when the values of $P_1$-$P_4$ changes in an equal difference, the motion curve B(t) coincides with the straight line of uniform motion. When the angle threshold increases again, the absolute value of the slope of the points of the motion curve B(t) at the start rotation phase and the end rotation phase of the servo will exceed the first slope $K_1$, which obviously cannot solve the problem of the too large and too fast speed change at the start rotation phase and the end rotation phase of the servo due to uniform motion, and the problem will even become more serious. Therefore, the difference between the second rotational angle $P_2$ and the first rotational angle $P_1$ is calculated, and the angle threshold Y is set, where the angle threshold Y is not greater than 10% of the difference.

The setting of the value of P in FIG. 8A-FIG. 8E are all symmetric, that is, the difference ($P_3$−$P_1$) between $P_3$ and $P_1$ and the difference ($P_2$−$P_4$) between $P_2$ and $P_4$ are the same, because only one angle threshold Y is set. The motion curve B(t) obtained by such setting is also symmetrical. If two angle thresholds $Y_1$ and $Y_2$ are set, and the values of $Y_1$ and $Y_2$ are not equal, then the calculation formula of the two control points $P_3$ and $P_4$ is:

$$P_3=P_1+Y_1$$

$$P_4=P_2Y_2$$

Since the angle thresholds $Y_1$ and $Y_2$ are not equal, the difference ($P_3$−$P_1$) between $P_3$ and $P_1$ and the difference ($P_2$−$P_4$) between $P_2$ and $P_4$ are not equal, so the obtained motion curve is asymmetrical. However, whether one angle threshold Y is set or the two angle thresholds $Y_1$ and $Y_2$ are set, as long as the angle threshold not exceeds 10% of the difference between $P_2$ and $P_1$, the motion curve B(t) meeting the requirements can be obtained.

Preferably, the second time $T_2$ is any integer between 30 times and 100 times of the first time $T_1$.

In this embodiment, the second time $T_2$ is set to be any integer between 30 times and 100 times of the first time $T_1$, and then the obtained second time $T_2$ can be more reasonable. For example, the first time $T_1$ is 20 milliseconds, the second time $T_2$ is any integer between 30 times and 100 times of the first time $T_1$, then the second time $T_2$ is any integer between 600 milliseconds and 2000 milliseconds, which means that the time required for the output shaft of the servo to complete one turning motion is between 0.6 seconds and 2 seconds. If the second time $T_2$ is greater than 100 times of the first time $T_1$, for example, the first time $T_1$ is 20 milliseconds, and the second time $T_2$ is 200 times of the first time $T_1$, then the obtained second time $T_2$ is 20 ms*200=400 ms. At this time, the robot needs to rotate 200 times to complete one turning motion, and it takes 4 seconds, which makes the robot seem unresponsive. Meanwhile, if the second time $T_2$ is less than 30 times of the first time $T_1$, for example, the second time $T_2$ is 10 times of the first time $T_1$, then the obtained second time is 0.2 seconds. At this time, the robot only needs to rotate 10 times to complete one turning motion, and it takes 0.2 seconds, which means that if the robot is to rotate from 30° to 100°, then the robot needs to turn 7° every 0.02 seconds, and such a large angle is likely to cause the robot to fall due to instability in the gravity center. Therefore, in this embodiment, the second time $T_2$ is preferably set to an integer between 30 times and 100 times of the first time $T_1$.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed method and apparatus for a robot may be implemented in other manners. For example, the above-mentioned method and apparatus for a robot embodiment is merely exemplary. For example, the division of units is merely a logical functional division, and other division manner may be used in actual implementations, that is, multiple units or components may be combined or be integrated into another system, or some of the features may be ignored or not performed.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated unit is implemented in the form of a software functional unit and is sold or used as an independent product, the integrated unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented motion control method for a servo of a robot, comprising executing on a processor the steps of:

obtaining a first rotational angle $P_1$ of an output shaft of the servo currently at and a first time $T_1$ for the output shaft of the servo to perform one rotation;

obtaining a second rotational angle $P_2$ for the output shaft of the servo to reach and a second time $T_2$ for the output shaft of the servo to rotate from the first rotational angle $P_1$ to the second rotational angle $P_2$;

calculating a motion curve B(t) of the output shaft of the servo based on the first rotational angle $P_1$, the second rotational angle $P_2$, the first time $T_1$, and the second time $T_2$, wherein the motion curve B(t) indicates every reached rotational angle of the output shaft of the servo during the second time $T_2$; the slope of each point on the motion curve B(t) has the same sign as a first slope $K_1$, where the first slope $K_1$ is the slope of uniform motion determined based on the second rotational angle $P_2$, the first rotational angle $P_1$, the second time $T_2$, and the first time $T_1$; and an absolute value of the slope of the motion curve B(t) at a start rotation phase and an end rotation phase of the servo is less than an absolute value of the first slope $K_1$; and controlling the servo to rotate according to the motion curve B(t);

wherein the step of calculating the motion curve B(t) of the output shaft of the servo based on the first rotational angle $P_1$, the second rotational angle $P_2$, the first time $T_1$, and the second time $T_2$ comprises:

setting an angle threshold Y based on the first rotational angle $P_1$ and the second rotational angle $P_2$;

determining a third rotational angle $P_3$ based on a sum of the first rotational angle $P_1$ and the angle threshold Y, and determining a fourth rotational angle $P_4$ based on a difference between the second rotational angle $P_2$ and the angle threshold;

determining a first number N of the motion curve B(t) through dividing the second time $T_2$ by the first time $T_1$, wherein the first number N is a total rotation number for the output shaft of the servo to rotate from the first rotational angle $P_1$ to the second rotational angle $P_2$; and calculating the motion curve B(t) of the output shaft of the servo based on the first rotational angle $P_1$, the second rotational angle $P_2$, the third rotational angle $P_3$, the fourth rotational angle $P_4$, and the first number N through the following formula:

$$B(t) = (1-t)^3 \times P_1 + 3(1-t)^2 \times t \times P_3 + 3(1-t) \times t^2 \times P_4 + t^3 \times P_2$$

$$n \in [1, N], t = \frac{n}{N};$$

and wherein the step of setting the angle threshold Y based on the first rotational angle $P_1$ and the second rotational angle $P_2$ comprises:

calculating a difference between the second rotational angle $P_2$ and the first rotational angle $P_1$; and setting the angle threshold Y, wherein the angle threshold Y is not greater than 10% of the difference.

2. The method of claim 1, wherein the motion curve B(t) comprises a slope increase phase and a slope decrease phase; the method further comprising setting the slope increase phase and the slope decrease phase according to a change trend of an absolute value of the slope of the points on the motion curve B(t), wherein:

in the slope increase phase, a difference between an absolute value of the slope of any current point on the motion curve B(t) and an absolute value of the slope of the next point of the current point is negative, and the difference is greater than a first threshold value $V_1$; and in the slope decrease phase, a difference between an absolute value of the slope of any current point on the motion curve B(t) and an absolute value of the slope of the next point of the current point is positive, and the difference is less than a second threshold value $V_2$.

3. The method of claim 1, wherein the second time $T_2$ is any integer between 30 and 100 times of the first time $T_1$.

4. A motion control apparatus for a servo of a robot, comprising:

one or more processors;

a storage; and one or more computer programs stored in the storage and executed by the one or more processors;

wherein the motion control apparatus is installed in the robot, and the one or more computer programs comprise:

instructions to obtain a first rotational angle $P_1$ of an output shaft of the servo currently at and a first time $T_1$ for the output shaft of the servo to perform one rotation, and obtain a second rotational angle $P_2$ for the output shaft of the servo to reach and a second time $T_2$ for the output shaft of the servo to rotate from the first rotational angle $P_1$ to the second rotational angle $P_2$;

instructions to calculate a motion curve B(t) of the output shaft of the servo based on the first rotational angle $P_1$, the second rotational angle $P_2$, the first time $T_1$, and the second time $T_2$, wherein the motion curve B(t) indicates every reached rotational angle of the output shaft of the servo during the second time $T_2$; the slope of each point on the motion curve B(t) has the same sign as a first slope $K_1$, where the first slope $K_1$ is the slope of uniform motion determined based on the second rotational angle $P_2$, the first rotational angle $P_1$, the second time $T_2$, and the first time $T_1$; and an absolute value of the slope of the motion curve B(t) at a start rotation phase and an end rotation phase of the servo is less than an absolute value of the first slope $K_1$; and instructions to control the servo to rotate according to the motion curve B(t);

wherein the instructions to calculate the motion curve B(t) of the output shaft of the servo based on the first rotational angle $P_1$, the second rotational angle $P_2$, the first time $T_1$, and the second time $T_2$ comprise:

instructions to set an angle threshold Y based on the first rotational angle $P_1$ and the second rotational angle $P_2$;

instructions to determine a third rotational angle $P_3$ based on a sum of the first rotational angle $P_1$ and the angle threshold Y, and determine a fourth rotational angle $P_4$ based on a difference between the second rotational angle $P_2$ and the angle threshold;

instructions to determine a first number N of the motion curve B(t) through dividing the second time $T_2$ by the first time $T_1$, wherein the first number N is a total rotation number for the output shaft of the servo to rotate from the first rotational angle $P_1$ to the second rotational angle $P_2$; and instructions to calculate the motion curve B(t) of the output shaft of the servo based on the first rotational angle $P_1$, the second rotational angle $P_2$, the third rotational angle $P_3$, the fourth rotational angle $P_4$, and the first number N through the following formula:

$$B(t) = (1-t)^3 \times P_1 + 3(1-t)^2 \times t \times P_3 + 3(1-t) \times t^2 \times P_4 + t^3 \times P_2$$

$$n \in [1, N], t = \frac{n}{N};$$

and wherein the instructions to set the angle threshold Y based on the first rotational angle $P_1$ and the second rotational angle $P_2$ comprise:

instructions to calculate a difference between the second rotational angle $P_2$ and the first rotational angle $P_1$; and instructions to set the angle threshold Y, wherein the angle threshold Y is not greater than 10% of the difference.

5. The apparatus of claim 4, wherein the second time $T_2$ is any integer between 30 and 100 times of the first time $T_1$.

6. The apparatus of claim 4, wherein the motion curve B(t) comprises a slope increase phase and a slope decrease phase; and the one or more computer programs further comprise:

instructions to set the slope increase phase and the slope decrease phase according to a change trend of an absolute value of the slope of the points on the motion curve B(t), wherein:

in the slope increase phase, a difference between an absolute value of the slope of any current point on the motion curve B(t) and an absolute value of the slope of the next point of the current point is negative, and the difference is greater than a first threshold value $V_1$; and in the slope decrease phase, a difference between an absolute value of the slope of any current point on the motion curve B(t) and an absolute value of the slope of the next point of the current point is positive, and the difference is less than a second threshold value $V_2$.

7. A robot comprising:
   at least a servo;
   one or more processors;
   a memory; and
   one or more computer programs stored in the memory and executable on the one or more processors, wherein the one or more computer programs comprise:
   instructions for obtaining a first rotational angle $P_1$ of an output shaft of the servo currently at and a first time $T_1$ for the output shaft of the servo to perform one rotation, and obtain a second rotational angle $P_2$ for the output shaft of the servo to reach and a second time $T_2$ for the output shaft of the servo to rotate from the first rotational angle $P_1$ to the second rotational angle $P_2$;
   instructions for calculating a motion curve B(t) of the output shaft of the servo based on the first rotational angle $P_1$, the second rotational angle $P_2$, the first time $T_1$, and the second time $T_2$, wherein the motion curve B(t) indicates every reached rotational angle of the output shaft of the servo during the second time $T_2$; the slope of each point on the motion curve B(t) has the same sign as a first slope $K_1$, where the first slope $K_1$ is the slope of uniform motion determined based on the second rotational angle $P_2$, the first rotational angle $P_1$, the second time $T_2$, and the first time $T_1$; and an absolute value of the slope of the motion curve B(t) at a start rotation phase and an end rotation phase of the servo is less than an absolute value of the first slope $K_1$; and
   instructions for controlling the servo to rotate according to the motion curve B(t);
   wherein the instructions for calculating the motion curve B(t) of the output shaft of the servo comprise:
   instructions for setting an angle threshold Y based on the first rotational angle $P_1$ and the second rotational angle $P_2$;
   instructions for determining a third rotational angle $P_3$ based on a sum of the first rotational angle $P_1$ and the angle threshold Y, and determine a fourth rotational angle $P_4$ based on a difference between the second rotational angle $P_2$ and the angle threshold;
   instructions for determining a first number N of the motion curve B(t) through dividing the second time $T_2$ by the first time $T_1$, wherein the first number N is a total rotation number for the output shaft of the servo to rotate from the first rotational angle $P_1$ to the second rotational angle $P_2$; and
   instructions for calculating the motion curve B(t) of the output shaft of the servo based on the first rotational angle $P_1$, the second rotational angle $P_2$, the third rotational angle $P_3$, the fourth rotational angle $P_4$, and the first number N through the following formula:

$$B(t) = (1-t)^3 \times P_1 + 3(1-t)^2 \times t \times P_3 + 3(1-t) \times t^2 \times P_4 + t^3 \times P_2$$
$$n \in [1, N], t = \frac{n}{N};$$

and
   wherein the instructions for setting the angle threshold Y comprise:
   instructions for calculating a difference between the second rotational angle $P_2$ and the first rotational angle $P_1$; and
   instructions for setting the angle threshold Y, wherein the angle threshold Y is not greater than 10% of the difference.

8. The robot of claim 7, wherein the second time $T_2$ is any integer between 30 and 100 times of the first time $T_1$.

9. The robot of claim 7, wherein the motion curve B(t) comprises a slope increase phase and a slope decrease phase; and
   the one or more computer programs further comprise:
   instructions for setting the slope increase phase and the slope decrease phase according to a change trend of an absolute value of the slope of the points on the motion curve B(t), wherein:
   in the slope increase phase, a difference between an absolute value of the slope of any current point on the motion curve B(t) and an absolute value of the slope of the next point of the current point is negative, and the difference is greater than a first threshold value $V_1$; and
   in the slope decrease phase, a difference between an absolute value of the slope of any current point on the motion curve B(t) and an absolute value of the slope of the next point of the current point is positive, and the difference is less than a second threshold value $V_2$.

* * * * *